Nov. 1, 1966 C. A. SERRIADES 3,282,534

COMBINATION AIRCRAFT

Filed Nov. 27, 1964 7 Sheets-Sheet 1

INVENTOR.
CONSTANTINE A. SERRIADES

BY Hill, Sherman, Meroni, Gross & Simpson
ATTORNEYS

Nov. 1, 1966 C. A. SERRIADES 3,282,534

COMBINATION AIRCRAFT

Filed Nov. 27, 1964 7 Sheets-Sheet 2

INVENTOR.
CONSTANTINE A. SERRIADES

BY Hill, Sherman, Meroni, Gross & Simpson
ATTORNEYS

Nov. 1, 1966 C. A. SERRIADES 3,282,534

COMBINATION AIRCRAFT

Filed Nov. 27, 1964 7 Sheets-Sheet 3

INVENTOR.
CONSTANTINE A. SERRIADES

BY Hill, Sherman, Meroni, Gross & Simpson
ATTORNEYS

INVENTOR.
CONSTANTINE A. SERRIADES

BY Hill, Sherman, Meroni, Gross & Simpson
ATTORNEYS

INVENTOR.
CONSTANTINE A. SERRIADES

BY Hill, Sherman, Meroni, Gross & Simpson
ATTORNEYS

INVENTOR.
CONSTANTINE A. SERRIADES

BY Hill, Sherman, Meroni, Gross & Simpson
ATTORNEYS

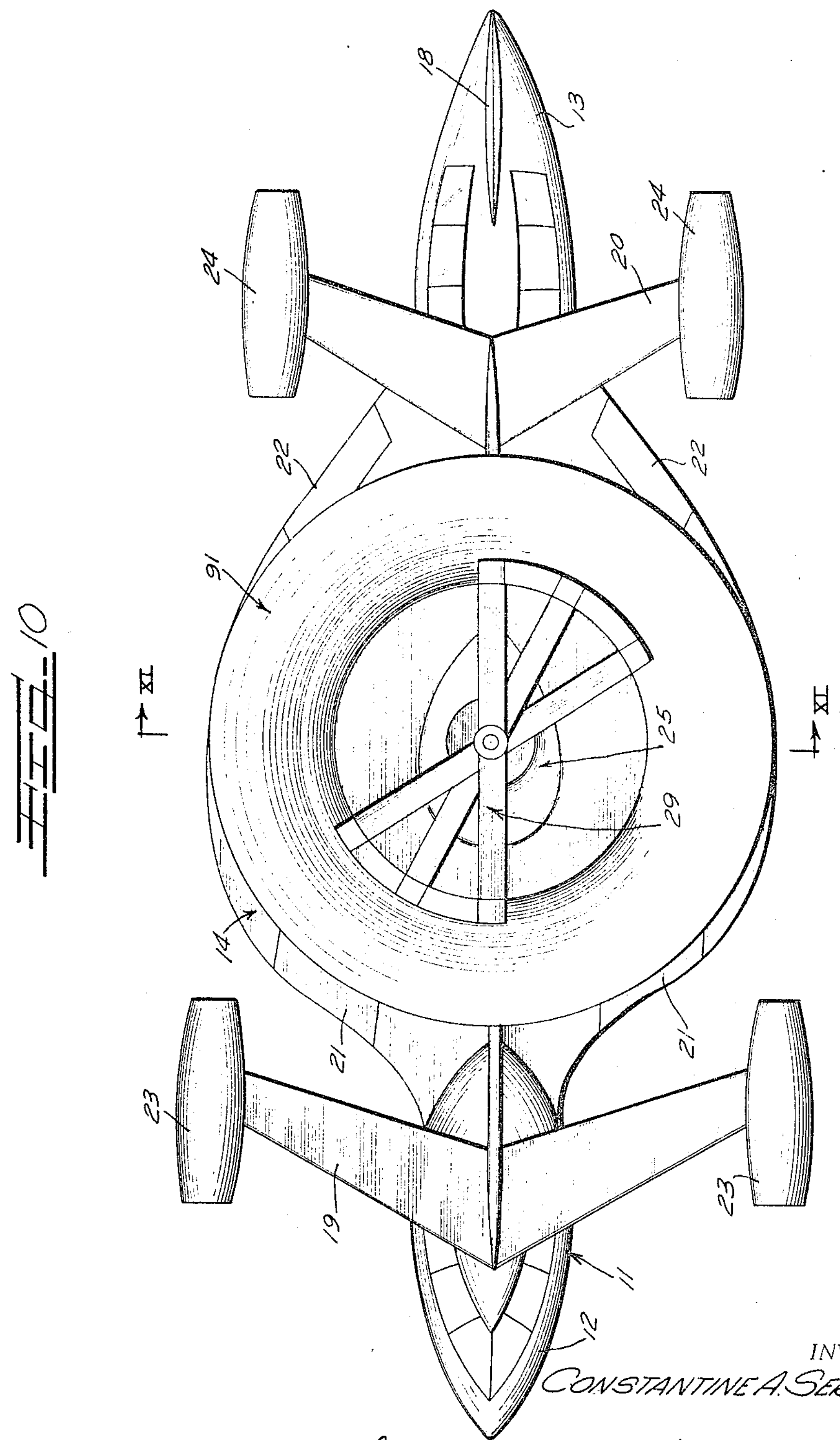
INVENTOR.
CONSTANTINE A. SERRIADES
BY Hill, Sherman, Meroni, Gross & Simpson
ATTORNEYS United States Patent Office 3,282,534

Patented Nov. 1, 1966

3,282,534
COMBINATION AIRCRAFT

Constantine A. Serriades, Chicago, Ill.; Michael Lascaris and Costas Pandaleon, executors of said Constantine A. Serriades, deceased Filed Nov. 27, 1964, Ser. No. 414,068
17 Claims. (Cl. 244—6)

This invention generally relates to an aircraft and more particularly relates to an improved aircraft which has a wing section interconnecting separated front and rear cabin sections and the aircraft having a plurality of jets for propulsion thereof.

Airplanes and the like generally have a fuselage that continuously extends from the front section to the tail section of the airplane to provide a continuous cabin section for the aircraft. The present invention is concerned mainly with combination airplanes that have both vertical take-off as well as forward propulsion. Generally, an aircraft is vertically lifted off the ground by an upward lifting force provided by directing a stream of air toward the ground. Many types of combination airplanes have been proposed and operated that rely mainly on this type of lifting force which is produced by a helicopter propeller or by the thrust of pivotal jet engines. These combination airplanes, especially those utilizing pivotal jet engines were replete with problems of "taking off" during wind velocities greater than 15 miles per hour. The present invention substantially eliminates the problems of vertical take-off by providing a combination airplane that uses an induced lifting force on the lifting surfaces of the airplane to vertically lift the airplane above a landing strip.

Therefore, it is an object of the present invention to provide an improved airplane.

It is another object of the present invention to provide a combination airplane being capable of vertical movement by inducing lifting forces on a lifting surface.

It is still another object of the present invention to provide an improved combination airplane which utilizes the down draft of helicopter propellers to induce a differential pressure on lifting surfaces of the aircraft.

It is still a further object of the present invention to provide a combination airplane utilizing forward jet propulsion in combination with vertical propulsion induced by a mechanism that causes a differential pressure on the lifting surfaces of the aircraft.

It is still another object of the present invention to provide an airplane with a central wing member interconnecting separated front and rear cabin sections of the airplane.

It is another object of the present invention to provide the combination airplane having pivotal jet engines used in combination with a vertical lifting means which has helicopter propellers operating a plurality of compressors and has a plurality directing passages to provide means for directing air transversely over the upper side of a lifting surface to reduce the pressure thereon and thereby provide a vertical lifting force for the combination aircraft.

Other features, objects, and advantages of the present invention will become apparent to those skilled in the art after a careful consideration of the following detailed description and accompanying drawings wherein like reference numerals and characters refer to like and corresponding parts throughout the several views.

FIG. 7 is a partial cross-sectional view with parts in elevation and taken along line VII—VII of FIG. 6;

FIG. 8 is a partial cross-sectional view with parts in elevation and taken along lines VIII—VIII of FIG. 6;

FIG. 10 is a top view of the combination airplane illustrated in FIG. 9; and

Figure 1:
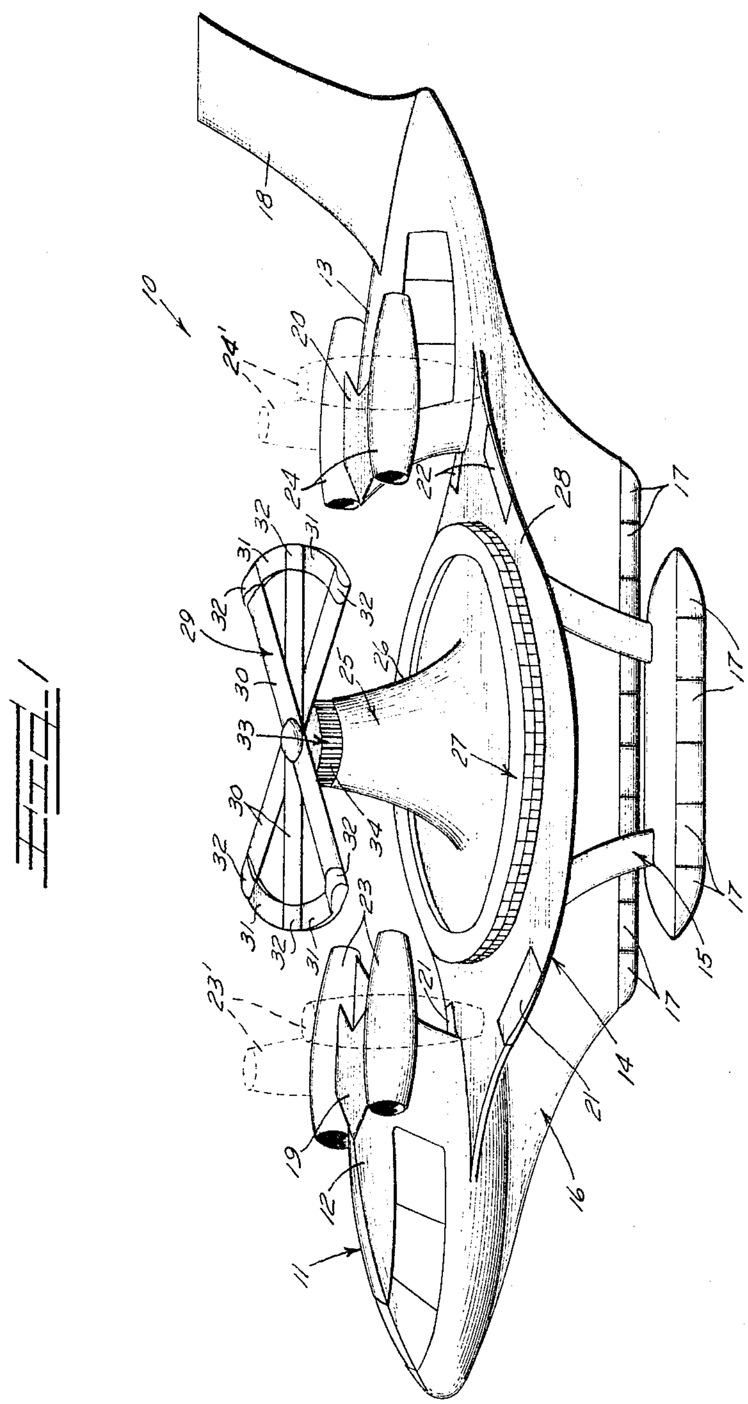
FIG. 1 is a perspective view illustrating a combination airplane constructed in accordance with the principles of the present invention.
Figure 2:
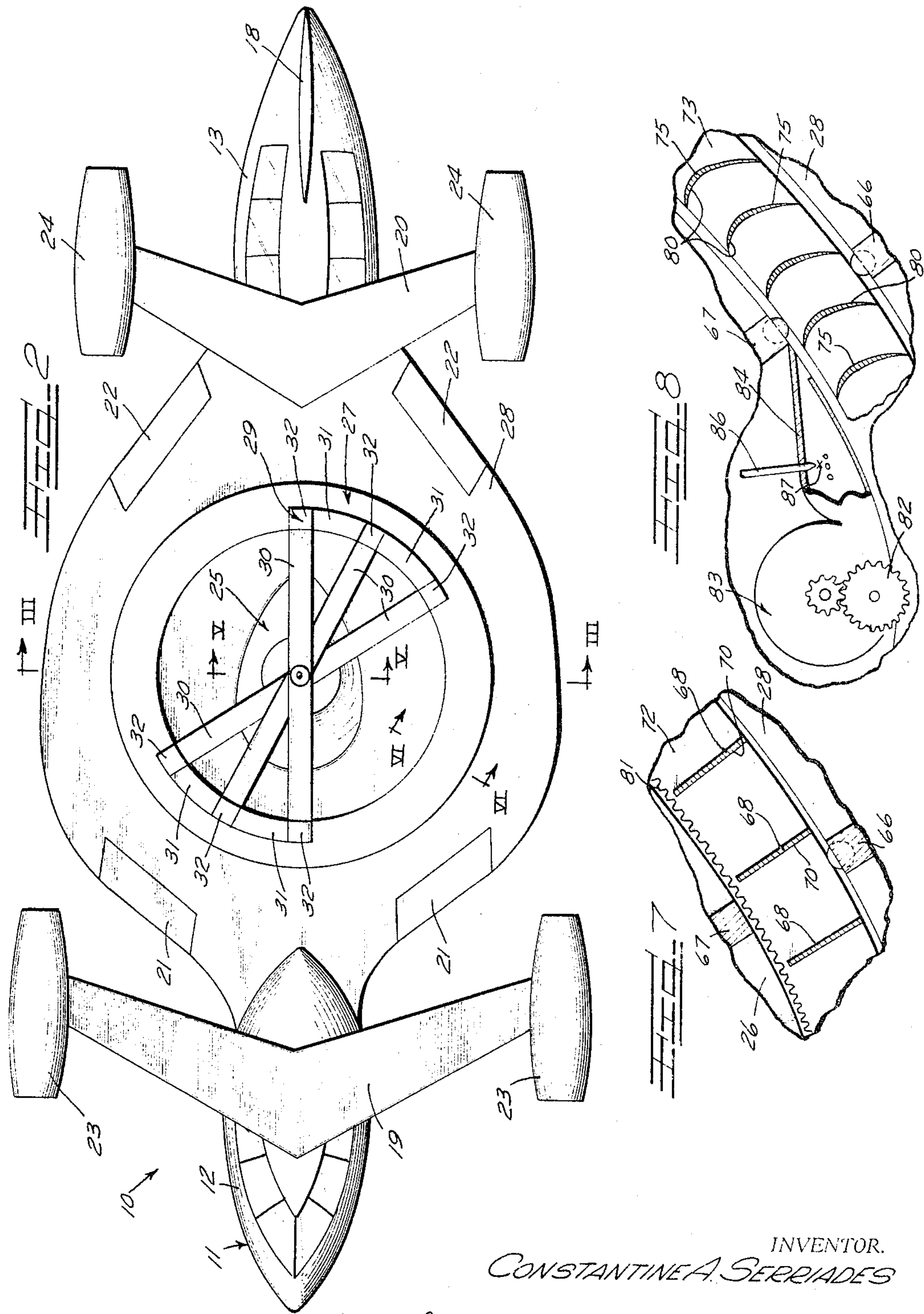
FIG. 2 is a top view of the combination airplane illustrated in FIG. 1.

As illustrated in FIGS. 1 and 2, a combination aircraft 10 has a divided fuselage 11 defining a front pressurized cabin 12, which is normally used for the crew and passengers of the aircraft and a rear pressurized cabin 13 which is normally used for the passengers of the aircraft. The front and rear cabins 12 and 13 are interconnected below the top surfaces thereof by a central oval lifting surface or wing 14 that extends beyond both sides of the fuselage. The oval wing has a pair of front control members 21 located adjacent the front cabin with one control member 21 being on each side of the fuselage, has a pair of rear control members 22 located adjacent the rear cabin with one control member 22 being on each side of the fuselage, and has a pair of retractable landing support members 15 retractably mounted to the undersurface of the wing 14 and positioned respectively on opposite sides of the fuselage 11. A keel type base structure 16 extends from the bottom of the fuselage. A plurality of pontoon supports 17 are suitably connected to the landing supports and the keel base. The portions are constructed and operate as the portions disclosed in my copending application Ser. No. 335,149 filed on January 2, 1964, now Patent No. 3,172,116.

The rear cabin has a tail fin 18, a rear wing section 20 attached to the top thereof and extending beyond both sides thereof while the front cabin has a front wing section 19 attached to the top thereof and extending beyond both sides thereof. The front and rear wing sections have a number of jet engines 23 and 24 suitably pivotally connected to the respective ends thereof.

The jets 23 and 24 may be pivoted from their horizontal position where they are used for forward propulsion of the aircraft to a vertical position 23' and 24' for aiding in the vertical lifting of the aircraft.

A tubular housing 25 extends centrally from a top surface 28 of the wing 14 and the housing has a concave outer surface 26 concaving from a relatively narrow open top end to a relatively wide bottom end. An annular directing vane means 27 is attached to the wing top surface 28 about the periphery of the housing bottom end and a jet helicopter propeller 29 is rotatably attached above the tubular housing 25. The helicopter propeller has a plurality of propeller blades 30 interconnected at their ends by a number of sectors 31 and also, a number of S-shaped jets 32 on the ends of said propeller blades. The propeller 29 is similar to the propeller disclosed in my copending application Ser. No. 267,570 filed on March 25, 1963, now Patent No. 3,180,424. An annular intake fan 33 is corotatively mounted on the underside of the propeller 29 about the tubular housing top end and has a plurality of spaced curved vertically disposed fan blades 34.

Figure 3:
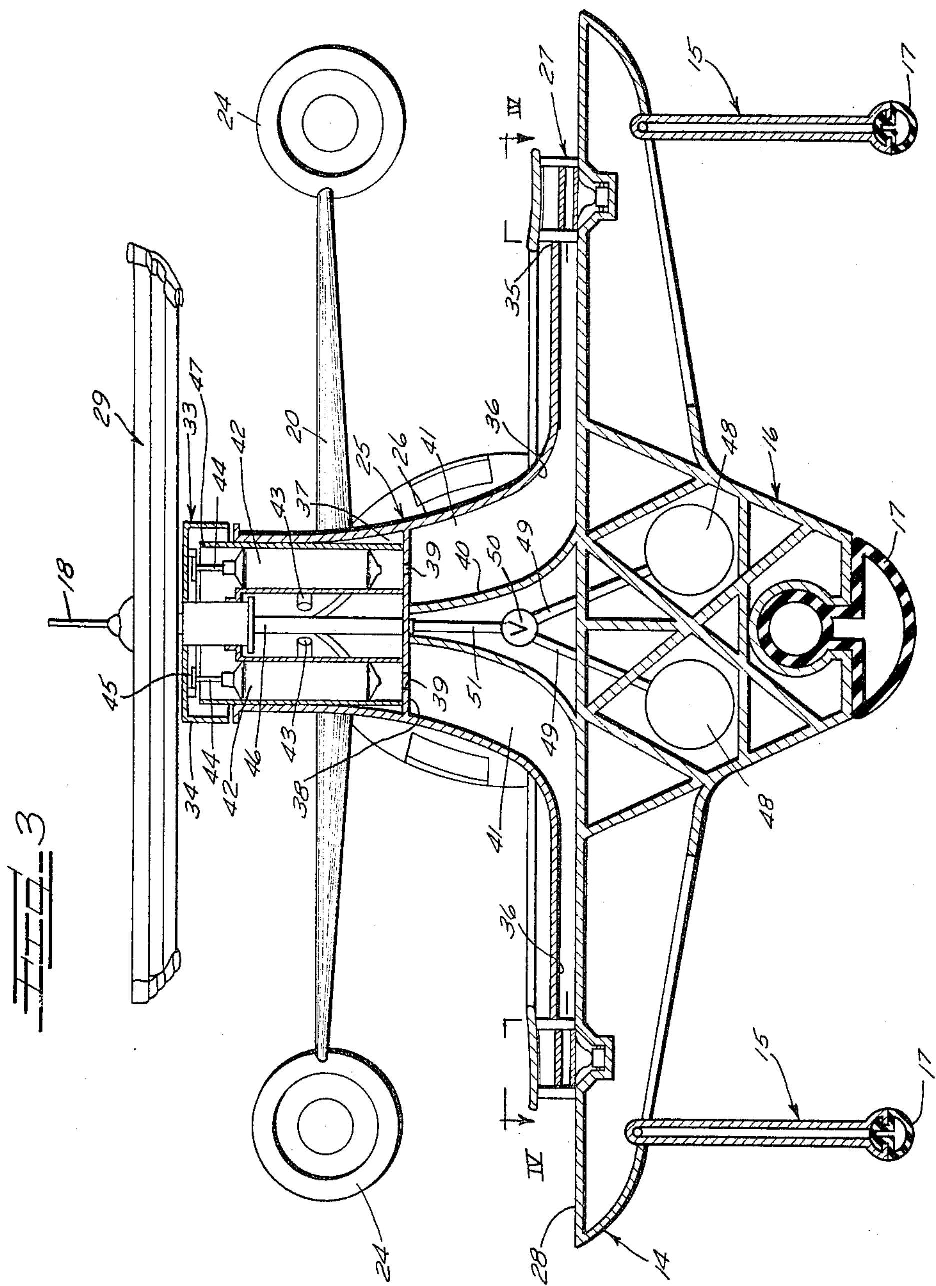
FIG. 3 is a cross-sectional view with parts in elevation taken along line III—III of FIG. 2.
Figure 4:
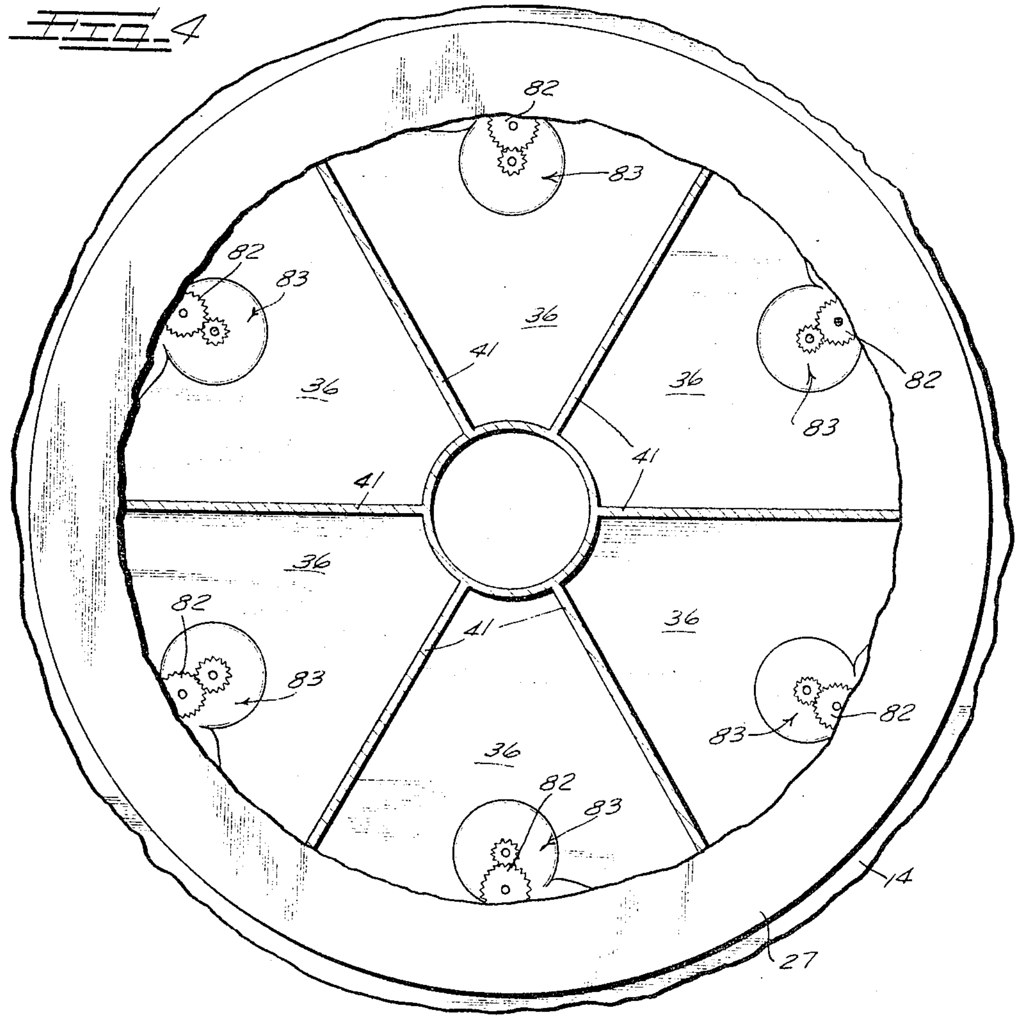
FIG. 4 is a partial transverse cross-sectional view with parts in elevation taken along line IV—IV of FIG. 3.

As illustrated in FIGS. 3 and 4, the tubular housing 25 has a circular lower end 35 spaced a predetermined distance above the wing top surface 28 and a vertical cylindrical air supply chamber 37 is formed by a circular transverse support 38 connected within the housing 25 and dividing the interior of the housing 25 into two sections. A central concave tubular directing structure 40 has an apex end attached to the under surface of the support 38 and a base end attached to the wing surface 28. A plurality of circumferentially spaced side surfaces 41 extend from the support 38 to the housing end 35 and are interconnected between the outer surface of the directing member 40 and the inner surface of the housing 25 to form a plurality of directing passages 36 which have their outlet extending transversely to the axis of the fuselage and transversely to the wing top surface 28. Said support 38 has a plurality of openings 39 communicating the supply chamber 37 with each of the flow passages 36 to form the air inlets for said flow passages. In the embodiment illustrated, the housing 25 is divided into six passages. However, it is of course understood, that the number of passages may be varied as desired.

A plurality of axial compressors 42 are mounted within the supply chamber 37 and a plurality of radial compressors 83 are mounted in the directing passages 36. The axial compressors have suitable outlets 43 and suitable actuating shafts 44 extending from one end thereof. The protruding ends of the shafts 44 have gear wheels 45 attached thereto.

A fixed tubular shaft 46 extends from the support 38 upwardly through an apex end 47 of the housing 25 and the helicopter propeller 29 is rotatably attached to the upper end thereof.

A plurality of fuel tanks 48 are suitably mounted in the keel 16 and have feed lines 49 leading to a regulating valve 50 which has suitable outlets connected to a fuel feed line 51.

Figures 5, 6:
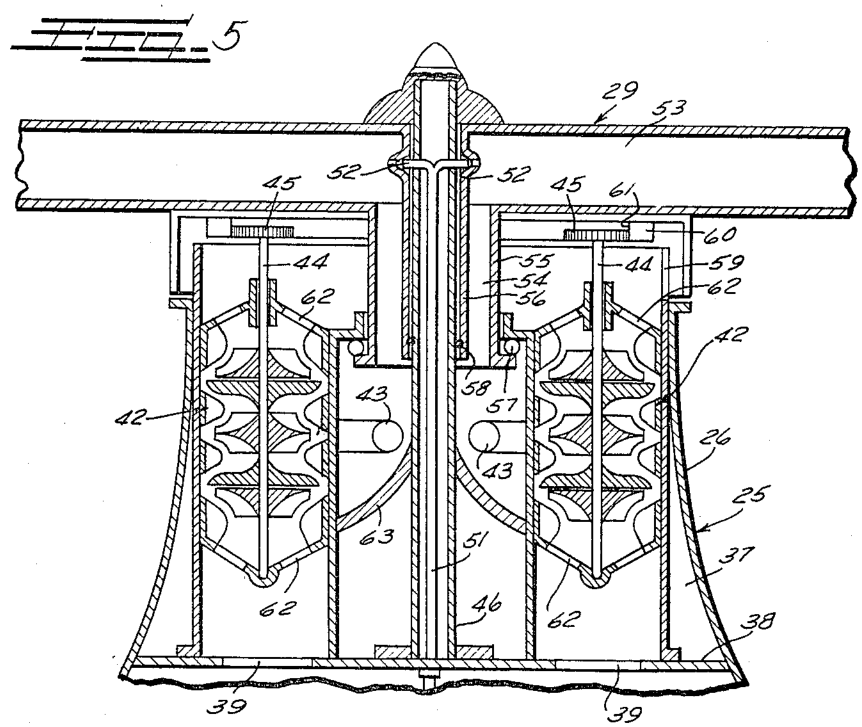
FIG. 5 is an enlarged partial transverse cross-sectional view taken along line V—V of FIG. 2.
FIG. 6 is an enlarged partial transverse cross-sectional view taken along line VI—VI of FIG. 2.

As illustrated in FIGURE 5, the fuel feed line 51 passes through the tubular shaft 46 and has connected at the end thereof a plurality of spray nozzles 52. The spray nozzles 52 are adapted to spray fuel into a central annular chamber 53 of the propeller 29. The nozzles atomize the fuel and the atomized fuel is mixed with compressed air within the chamber 53. The annular chamber 53 communicates with the jets 32 on the ends of the propeller 29 to deliver fuel and compressed air to the jets 32. An annular passage 54 is provided by spaced outer and inner annular walls 55 and 56 that extend downwardly from the annular chamber 53 and which rotate relative to the tubular shaft 46. The annular walls 55 and 56 are suitably supported by bearing means 57 and 58 within the housing upper section.

The annular fan 33 and its curved fan blades 34 are concentric with and are spaced radially outwardly from the apex end 47 of the housing. The tubular housing apex end 47 has a plurality of slots 59 therein that provide air inlets for air drawn by the annular fan 34 into the housing supply chamber 37. Concentric with the annular fan 34 and spaced inwardly therefrom is an annular gear member 60 having its internal surface 61 provided with a plurality of teeth that are sized to mesh with the teeth on the compressor gears 45. Thus, the compressor shafts 44 are rotated upon rotation of the propeller 29.

The axial compressors 42 have a plurality of inlets 62 at each end thereof and are suitably fixedly supported within the supply chamber 37. The compressors receive air from the supply chamber 37 that in turn receives air from the atmosphere with the aid of the annular fan 33. The air is compressed by the axial compressors and delivered by the compressor outlets 43 into the annular passage 54 with the aid of an annular directing vane 63 mounted in the housing adjacent the compressor outlets 43.

As is illustrated in FIGURES 6 to 8, the annular directing vane member 27 has a fixed outer housing 64 and an inner rotatable housing 71. The outer housing 64 has an annular top wall 65 fixedly secured to the housing by a plurality of circumferentially spaced outer vertical supports 66 and a plurality of circumferentially spaced inner vertical supports 67. The vertical supports 66 and 67 are radially spaced from each other to provide the interior of the housing 64.

The inner rotatable housing 71 has an upper wall 72, a lower annular wall 73 with an annular guide 74 projecting from the lower wall 73. A plurality of radially extending blades 68 extend upwardly from the upper wall 72 towards the wall 65 and a plurality of curved blades 75 interconnect the upper wall 72 and the lower wall 73. The walls 72 and 73 are suitably bearingly supported within the stationary housing 64 by a plurality of bearings 76 suitably attached to the vertical supports 66 and 67 as indicated in FIGURE 6. Likewise, the housing 71 is rotatably supported on the wing by a plurality of rollers 78 rotatably connected in an annular channel 79 formed within the wing 14.

The vanes 68 form a plurality of radial flow passages 70 that communicate with the outer surface of the housing 25 and vanes 75 form a plurality of arcuate flow passages 80 that communicate with the housing flow passages 36. The annular wall 72 has a plurality of gear teeth 81 formed on the inner periphery thereof. The gear teeth 81 mesh with the teeth on a number of gears 82 rotatably mounted within the flow passages 36. The gears 82 are suitably connected to the radial compressors 83 to actuate the compressors. The compressors 83 have outlets 84 that direct compressed air onto the concave curved surfaces of the arcuate vanes 75 to rotate the annular housing 71 relative to the stationary housing 64. The annular housing 71 is movably supported on the rollers 78 by the guide means 74. The compressed air supplied by the compressor may be given additional force by mixing fuel therewith by means of a fuel line and igniting the fuel and compressed air mixture with suitable ignition means 87.

In operation, the jets 32 on the ends of the helicopter propeller are activated to rotate the propeller and the jets 23 and 24 are put in their position 23′ and 24′ and also activated. The rotation of the helicopter propeller 29 causes rotation of the annular fan 33 that draws air into the compressors 42. The compressors 42 are actuated by the interconnection between the annular gear 60 and the actuator shaft gears 45. Air is delivered from the chamber 37 to the flow passages 36 and from the compressors 42 to the annular flow passage 54. The air in the directing passages 36 is delivered to the radial compressors that compress the air as well as utilizing for combustion and then directing it against the concave surfaces of the blades 75 to rotate the directing vane inner housing 71. The rotation of the inner housing 71 in turn actuates the compressors 83 through the rotating gears 82. Simultaneously therewith, the helicopter propeller is directing air downwardly onto the outer surface of the arcuate housing 25 with the housing directing this air to the radial passages 70. The air from the passages 70 and arcuate passages 80 are directed transversely to the axis of the fuselage and over the top surface 28 of the wing 14. The high velocity gas streams transversely flowing across the top surfaces of the wing 14 causes a differential in air pressure between the top and bottom surfaces of the wing 14 with the greater air pressure being exerted against the under surface of the wing 14. Therefore with the vertical lifting force on the wing 14 and with the vertically positioned jets 23′ and 24′, the aircraft may be vertically lifted to a desired height wherein the jets are pivoted to their horizontal positions 23 and 24 to provide forward propulsion of the aircraft.

Figure 11:
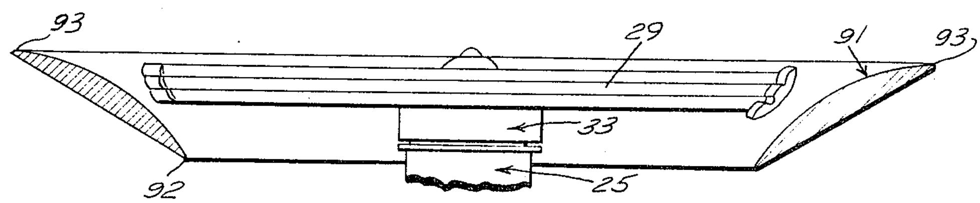
FIG. 11 is a partial transverse cross-sectional view with parts in elevation taken along line XI—XI of FIG. 10.
Figure 9:
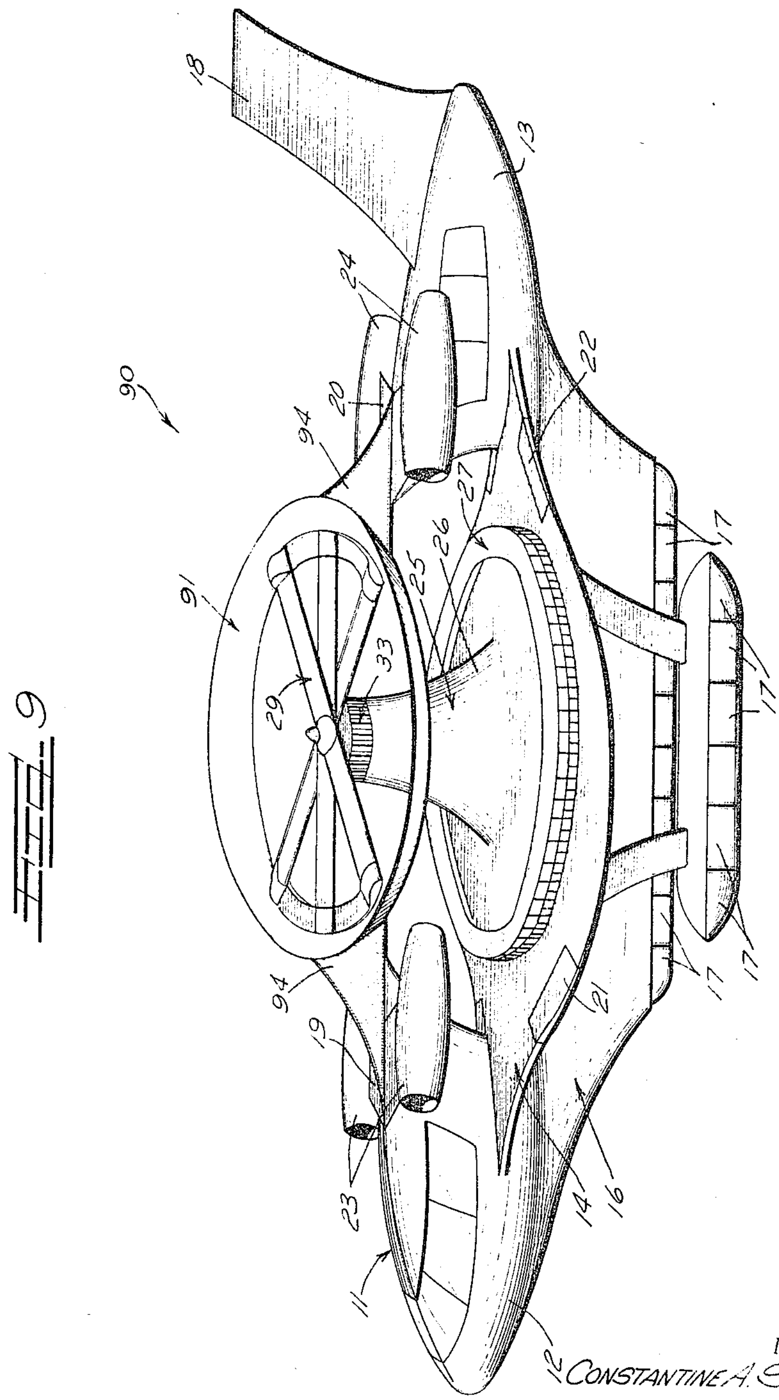
FIG. 9 is a perspective view illustrating another embodiment of a combination airplane constructed in accordance with the principles of the present invention.

As illustrated in FIGS. 9–11, another combination aircraft 90 is provided which is the same as the combination aircraft 10 except it has an inverted tubular frusto-conical member 91 encircling the propeller 29. The tubular member 91 preferably has an air-foil shape with its apex end 92 facing the wing 14. The apex end 92 has an inner diameter less than the outer diameter of the directing vane means 27 and preferably equal to the inner diameter of the directing vane means 27. The inner diameter of the base end 93 of the tubular member 91 is preferably equal to the span of the wing 14. The tubular member 91 is supported by a pair of supports 94 attached to the front and rear wings 19 and 20 but of course, other and additional supports may be utilized if desired. The tubular member 91 is used to aid in directing air from the helicopter propeller 29 to the concave surface of the directing member 25. The tubular member 91 substantially eliminates vertical airstreams which tend to exert a force opposite the desired lifting forces and thereby provides a more efficient vertical take-off combination aircraft.

Although minor modifications might be suggested by those skilled in the art, it should be understood that I wish to embody within the scope of the patent warranted hereon all such embodiments as reasonably and properly come within the scope of my contribution to the art.

I claim as my invention:

1. A transport aircraft comprising:
a fuselage having spaced front and rear cabins;
wing means interconnecting said front and rear cabins and extending beyond both sides of said fuselage;
said wing means having a top surface including a central portion and a peripheral portion surrounding said central portion and being positioned below the top surfaces of said front and rear cabins;
air moving means mounted on said wing means in surrounding relation to said central portion for compressing and directing air only radially outwardly of said air moving means across the peripheral portion of said wing means; and
a plurality of jets attached to said aircraft to propel said aircraft.

2. A transport aircraft comprising:
a fuselage having a substantially disc-shaped wing mounted thereon;
said wing having a top surface including a central portion and a peripheral portion surrounding said central portion;
annularly shaped air moving means mounted on said wing in surrounding relation to said central portion for compressing and directing air only radially outwardly of said air moving means across the peripheral portion of said wing;
a rear wing attached to said fuselage and extending beyond both sides thereof; and
a pair of jets connected to the ends of said rear wing for propulsion of said aircraft.

3. A transport aircraft comprising:
a fuselage having a disc-shaped wing mounted thereon;
said wing having a top surface including a central portion and a peripheral portion surrounding said central portion;
annularly shaped air moving means mounted on said wing and comprising a plurality of vanes forming a plurality of radially extending flow passages for directing air only radially outwardly of said air moving means and across the peripheral portion of the top surface of the wing;
said air moving means including compressor means to deliver compressed air to said flow passages; and
a plurality of jets attached to said aircraft to propel said aircraft.

4. A transport aircraft comprising:
a fuselage having a spaced front and rear cabin portion;
a wing means interconnecting said front and rear cabin portions and extending beyond both sides of said fuselage;
said wing being positioned below the top surfaces of said front and rear cabins;
an annular directing vane means mounted on the top surface of said wing concentrically therewith and being spaced inwardly from the ends of said wing;
said directing vane means having a means forming a plurality of radially extending passages therethrough and a plurality of arcuate flow passages therethrough that are rotatable about the axis of said directing vane means;
means connected to said directing vane means to deliver compressed air to said flow passages so that air is directed transversely to the axis of said fuselage and transversely across the top surface of said wing to reduce the pressure thereon and permit the aircraft to be vertically raised and lowered; and
a plurality of jets attached to said aircraft to propel said aircraft.

5. A transport aircraft comprising:
a fuselage having a spaced front and rear cabin portion,
a wing means interconnecting said front and rear cabin portions and extending beyond both sides of said fuselage;
said wing being positioned below the top surfaces of said front and rear cabins;
an annular directing vane means mounted on the top surface of said wing concentrically therewith and being spaced inwardly from the ends of said wing and being adapted to direct air transversely across the top surface of the wing;
said directing vane having an outer housing formed with a plurality of spaced side supports fixedly secured to said wing and extending upwardly therefrom and an annular top surface interconnecting said spaced supports and inner housing having a plurality of inner and outer vanes and an annular top surface forming a plurality of flow passages, said inner housing being mounted within said directing vane outer housing and rotatably mounted to the wing means such that said inner housing moves relative to said directing vane outer housing;
means connected to said directing vane to deliver compressed air to said flow passages so that air is directed transversely to the axis of said fuselage and transversely across the top surface of said wing to reduce the pressure thereon and permit the aircraft to be vertically raised and lowered; and
a plurality of jets attached to said aircraft to propel said aircraft.

6. A transport aircraft comprising:
a fuselage having a spaced front and rear cabin portion,
a wing means interconnecting said front and rear cabin portions and extending beyond both sides of said fuselage;
said wing being positioned below the top surfaces of said front and rear cabins;
an annular directing vane means mounted on the top surface of said wing concentrically therewith and being spaced inwardly from the ends of said wing;
said directing vane having an outer housing formed with a plurality of spaced side supports fixedly secured to said wing and extending upwardly therefrom and an annular top surface interconnecting said spaced supports, and an inner housing having a plurality of inner and outer vanes mounted on an annular top surface forming a plurality of inner and outer flow passages, said inner housing being mounted within said directing vane outer housing and rotatably mounted to the wing means such that said inner housing moves relative to said directing vane and outer housing;
first air delivery means connected to said wing means to deliver air to said outer flow passages so that air is directed transversely to the axis of said fuselage and transversely across the top surface of said wing to reduce the pressure thereon and permit the aircraft to be vertically raised and lowered;

second air delivery means connected to said wing means to deliver air to said inner flow passages to rotate said directing vane inner housing and to direct air transversely to the axis of said fuselage and transversely across the top surface of said wing to reduce the pressure thereon and permit the aircraft to be vertically raised and lowered; and a plurality of jets attached to said aircraft to propel said aircraft.

7. A transport aircraft comprising:

a fuselage having a spaced front and rear cabin portion, an oval wing interconnecting said front and rear cabin portions and extending beyond both sides of said fuselage;

said wing being positioned below the top surfaces of said front and rear cabins;

an annular directing vane means mounted on the top surface of said wing concentrically therewith and being spaced inwardly from the ends of said wing;

said directing vane having a means forming a plurality of radially extending passages therethrough and a plurality of arcuate passages therethrough that are rotatable about the axis of said directing vane;

first air delivery means connected to said wing means to deliver air to said radial flow passages so that air is directed transversely to the axis of said fuselage and transversely across the top surface of wing to reduce the pressure thereon and permit the aircraft to be vertically raised and lowered;

second air delivery means connected to said wing means to deliver air to said arcuate flow passages to rotate said directing vane inner housing and to direct air transversely to the axis of said fuselage and transversely across the top surface of said wing to reduce the pressure thereon and permit the aircraft to be vertically raised and lowered;

a rear wing attached to the top of said rear cabin portion and extending beyond both sides thereof; and a pair of jets connected to the ends of said rear wing for propulsion of said aircraft.

8. A transport aircraft comprising:

a fuselage having spaced front and rear cabins, wing means interconnecting said front and rear cabins and extending beyond both sides of said fuselage;

said wing comprising a central portion and a peripheral portion surrounding said central portion and being positioned below the top surfaces of said front and rear cabins;

a helicopter propeller rotatably mounted above the top surface of said wing means;

annularly shaped air moving means projecting upwardly from the top surface of said wing means and concentrically disposed with respect to the axis of rotation of said propeller for receiving air flowing downwardly from said propeller and across the top surface of the central portion of said wing and for compressing the air and directing it only radially outwardly of said air moving means at a higher pressure across the peripheral portion of said wing; and a plurality of jets attached to said aircraft to propel said aircraft.

9. A transport aircraft comprising:

a fuselage having spaced front and rear cabins, an oval wing interconnecting said front and rear cabins and extending beyond both sides of said fuselage;

said wing comprising a central portion and a peripheral portion surrounding said central portion and being positioned below the top surfaces of said front and rear cabins;

a helicopter propeller rotatably mounted have the top surface of said wing;

annularly shaped air moving means projecting upwardly from the top surface of said wing means and concentrically disposed with respect to the axis of rotation of said propeller for receiving air flowing downwardly from said propeller and across the top surface of the central portion of said wing and for compressing the air and directing it only radially outwardly of said air moving means at a higher pressure across the peripheral portion of said wing;

a rear wing attached to the top of said rear cabin and extending beyond both sides thereof; and a pair of jets connected to the ends of said rear wing for propulsion of said aircraft.

10. A transport aircraft comprising:

a fuselage having a spaced front and rear cabin portion, a wing means interconnecting said front and rear cabin portions and extending beyond both sides of said fuselage;

said wing being positioned below the top surfaces of said front and rear cabins;

a tubular housing extending from said wing, said tubular housing having an outer concave surface, and a plurality of inner flow passages having their outlets directed transverse to the axis of the fuselage to direct air transversely across the top surface of wing to reduce the pressure thereon and permit the aircraft to be vertically raised and lowered;

means to deliver air to said tubular housing outer concave surface and said housing inner flow passages;

directing means connected to said wing to receive air from said housing outer concave surface to direct the air therefrom transverse to the axis of said fuselage and transversely across the top surface of wing to reduce the pressure thereon and permit the aircraft to be vertically raised and lowered; and a plurality of jets attached to said aircraft to propel said aircraft.

11. A transport aircraft comprising:

a fuselage having a spaced front and rear cabin portion, a wing means interconnecting said front and rear cabin portions and extending beyond both sides of said fuselage;

said wing being positioned below the top surfaces of said front and rear cabins;

a tubular housing extending from said wing, said tubular housing having an outer concave surface, and a plurality of inner flow passages having their outlets directed transverse to the axis of the fuselage to direct air transversely across the top surface of wing to reduce the pressure thereon and permit the aircraft to be vertically raised and lowered;

a helicopter propeller rotatably mounted above said tubular housing and adapted to supply air to the outer concave surface thereof;

directing means connected to said wing to receive air from said housing outer concave surface to direct the air therefrom transverse to the axis of said fuselage and transversely across the top surface of wing to reduce the pressure thereon and permit the aircraft to be vertically raised and lowered;

an intake fan means attached to said propeller adjacent said tubular housing to deliver air to said housing inner flow passages; and a plurality of jets attached to said aircraft to propel said aircraft.

12. A transport aircraft comprising:

a fuselage having a spaced front and rear cabin portion, a wing means interconnecting said front and rear cabin portions and extending beyond both sides of said fuselage;

said wing being positioned below the top surfaces of said front and rear cabins;

a tubular housing extending from said wing, said tubular housing having an outer concave surface, and a plurality of inner flow passages having their outlets directed transverse to the axis of the fuselage to direct air transversely across the top surface of wing to reduce the pressure thereon and permit the aircraft to be vertically raised and lowered;

a helicopter propeller rotatably mounted above said tubular housing and adapted to supply air to the outer concave surface thereof, an intake fan means attached to said propeller adjacent said tubular housing to deliver air to said housing inner flow passages;

an annular directing vane means mounted on the top surface of said wing concentrically therewith and being spaced inwardly from the ends of said wing;

said directing vane having a means forming a plurality of radially extending passages therethrough and a plurality of arcuate passages therethrough that are rotatable about the axis of said directing vane;

said annular directing vane means being mounted about the periphery of said tubular housing such that said housing outer concave surface directs air to said directing vane radial flow passages and said housing inner flow passages directs air to said directing vane arcuate flow passages; and a plurality of jets attached to said aircraft to propel said aircraft.

13. A transport aircraft comprising:

a fuselage having a spaced front and rear cabin portion;

an oval wing interconnecting said front and rear cabin portions and extending beyond both sides of said fuselage;

said wing being positioned below the top surfaces of said front and rear cabins;

a tubular housing extending from said wing, said tubular housing having an outer concave surface, and a plurality of inner flow passages having their outlets directed transverse to the axis of the fuselage to direct air transversely across the top surface of wing to reduce the pressure thereon and permit the aircraft to be vertically raised and lowered;

a helicopter propeller rotatably mounted above said tubular housing and adapted to supply air to the outer concave surface thereof, an intake fan means attached to said propeller adjacent said tubular housing to deliver air to said housing inner flow passages;

an annular directing vane means mounted on the top surface of said wing concentrically therewith and being spaced inwardly from the ends of said wing;

said directing vane having a means forming a plurality of outer flow passages therethrough and a plurality of inner flow passages therethrough that are rotatable about the axis of said directing vane;

said annular directing vane means being mounted about the periphery of said tubular housing such that said housing outer concave surface directs air to said directing vane outer flow passages and said housing inner flow passages directs air to said directing vane inner flow passages;

a rear wing attached to the top of said rear cabin portion and extending beyond both sides thereof; and a pair of jets connected to the ends of said rear wing for propulsion of said aircraft.

14. A transport aircraft comprising:

a fuselage having a spaced front and rear cabin portion, a wing means interconnecting said front and rear cabin portions and extending beyond both sides of said fuselage;

said wing being positioned below the top surfaces of said front and rear cabins;

a tubular housing extending from said wing, said tubular housing having an outer concave surface, and a plurality of inner flow passages having their outlets directed transverse to the axis of the fuselage to direct air transversely across the top surface of said wing to reduce the pressure thereon and permit the aircraft to be vertically raised and lowered;

a helicopter propeller rotatably mounted above said tubular housing and adapted to supply air to the outer concave surface thereof, an intake fan means attached to said propeller adjacent said tubular housing to deliver air to said housing inner flow passages;

an annular directing vane means mounted on the top surface of said wing concentrically therewith and being spaced inwardly from the ends of said wing;

said directing vane having an outer housing formed with a plurality of spaced side supports fixedly secured to said wing and extending upwardly therefrom and an annular top surface interconnecting said spaced supports, and an inner housing having a plurality of inner and outer vanes mounted on an annular top surface and forming a plurality of inner and outer flow passages, said inner housing being mounted within said directing vane outer housing and rotatably mounted to the wing means such that said inner housing moves relative to said directing vane outer housing;

said annular directing vane means being mounted about the periphery of said tubular housing such that said housing outer concave surface directs air to said directing vane outer flow passages and said housing inner flow passages directs air to said directing vane inner flow passages, a rear wing attached to the top of said rear cabin portion and extending beyond both sides thereof; and a pair of jets connected to the ends of said rear wing for propulsion of said aircraft.

15. A combination transport aircraft capable of vertical and forward propulsion comprising:

a fuselage having a spaced front and rear cabin portion, and a central power portion between said front and rear cabin portions;

an oval wing interconnecting said front and rear cabin portions and extending beyond both sides of said fuselage;

a front wing attached to the top of said front cabin portion and extending beyond both sides thereof;

a pair of first jets pivotally connected to the ends of said front wing;

a rear wing attached to the top of said rear cabin portion and extending beyond both sides thereof;

a pair of second jets pivotally connected to the ends of said rear wing;

a tubular housing supported on said oval wing and extending centrally upwardly therefrom and having a concave outer wall;

said tubular concave outer wall concaving from a central circular mouth spaced a predetermined distance above said oval wing to a wider lower portion having an end extending parallel to and spaced a predetermined distance above said oval wing and forming a plurality of first fluid flow passage having an axis extending transverse to the axis of the fuselage;

a plurality of axial compressors mounted within said tubular housing and said compressors having shafts to actuate said compressors with said shafts extending toward said central circular mouth and said shafts having gears attached to the ends thereof adjacent said central circular mouth;

a helicopter propeller rotatably mounted on a hollow shaft extending axially through said tubular housing and rotatably mounted adjacent said circular mouth to direct air downwardly onto said concave outer wall;

an annular intake fan member attached to said helicopter propeller and extending downwardly therefrom about said tubular housing;

a plurality of openings in said tubular housing adjacent said annular fan for receiving air from said fan member;

an annular gear co-rotatably attached to propeller and in driving engagement with said compressor shaft gears whereby rotation of said annular gear rotates said compressor shafts;

said helicopter propeller having a plurality of jets on the ends thereof to rotate said helicopter propeller;

means to feed fuel to said helicopter jets;

means forming a second passage within said tubular housing;

means connecting said second passage with said helicopters jets;

said axial compressors having outlets leading to said second passage to direct compressed air to said helicopter jets;

a chamber formed in said housing and interconnecting said first passages with said annular blade member to deliver air to said first passages;

a plurality of radial compressors connected to said tubular housing and having outlets communicating with said first passages to deliver compressed air thereto;

an annular directing vane mounted on said oval wing concentric with said housing other end and spaced inwardly from the ends of said oval wing and being adapted to direct air transversely across the top surface of the wing;

said directing vane having an upper stationary portion and having a lower rotating portion;

an annular roller structure mounted within said wing and engaging said directing vane lower portion to movably support said directing vane thereon, said directing vane lower portion having a plurality of actuating vanes adapted to rotate said directing vane lower portion upon receiving air from said first passage, and having an inner annular gear actuator means; and gear means interconnecting said radial compressors and said directing vane annular gear means to actuate said radial compressors when said directing vane lower portion rotates whereby air is delivered by the directing vane transversely across the top surface of wing to reduce the pressure thereon and permit the aircraft to be vertically raised and lowered.

16. A transport aircraft comprising:

a fuselage having a spaced front and rear cabin portion, a wing interconnecting said front and rear cabin portions and extending beyond both sides of said fuselage;

a helicopter propeller rotatably mounted above the top surface of said wing means;

directing means positioned below said propeller and having means to direct air received from said propeller transverse to said fuselage axis and transversely across the top surface of said wing to reduce the pressure thereon and permit the aircraft to be vertically raised and lowered;

a tubular air concentrating member encircling said propeller to direct air from the propeller onto the directing means; and jets attached to said aircraft for propulsion of said aircraft.

17. A transport aircraft comprising:

a fuselage having a spaced front and rear cabin portion, an oval wing interconnecting said front and rear cabin portions and extending beyond both sides of said fuselage;

said wing being positioned below the top surfaces of said front and rear cabins;

a helicopter propeller rotatably mounted above the top surface of said wing means;

directing means positioned below said propeller and having means to direct air received from said propeller transverse to said fuselage axis and transversely across the top surface of said wing to reduce the pressure thereon and permit the aircraft to be vertically raised and lowered;

a tubular air concentrating member encircling said propeller to direct air from the propeller onto the directing means;

a rear wing attached to the top of said rear cabin portion and extending beyond both sides thereof; and a pair of jets connected to the ends of said rear wing for propulsion of said aircraft.

References Cited by the Examiner

UNITED STATES PATENTS

| | | | |
|---|---|---|---|
| 3,156,434 | 11/1964 | Harrington | 244—7 |
| 3,216,673 | 11/1965 | Alter et al. | 244—12 |

FERGUS S. MIDDLETON, *Primary Examiner.*

MILTON BUCHLER, *Examiner.*

L. C. HALL, A. E. CORRIGAN, *Assistant Examiners.*